Patented Mar. 26, 1935

1,995,732

UNITED STATES PATENT OFFICE 1,995,732

PROCESS OF MANUFACTURING CELLULOSE ACETATE

Henri Louis Barthelemy, Rome, Ga., assignor to Ruth-Aldo Company, Inc., New York, N. Y., a corporation of New York No Drawing. Original application January 2, 1930, Serial No. 418,155. Divided and this application August 8, 1931, Serial No. 556,030

8 Claims. (Cl. 260—101)

The present invention relates to the manufacture of cellulose acetate for use in the manufacture of artificial silk sometimes caller "rayon". By the present invention there is produced by a short and simple process an artificial silk superior to the present known cellulose acetate rayons in the qualities of resisting to aging, and to heat; and one which will have better absorption of basic dyes. The new cellulose acetate rayon can be manufactured in much less time than the heretofore known cellulose acetate rayons. This application is a division of application No. 418,155, filed January 2, 1930.

Pure cellulose tri-acetate contains about 62.5% of acetyl groups calculated as acetic acid, and is soluble in chloroform, but is not soluble in acetone and similar solvents. After partial hydrolysis it becomes soluble in acetone and similar solvents and gives a product which in composition is intermediate between cellulose di-acetate and cellulose tri-acetate. It is possible to make an artificial silk using cellulose tri-acetate with chloroform as a solvent, but I have found it more desirable to use acetone and similar liquids as solvents for a partially hydrolyzed cellulose acetate. Heretofore cellulose acetate rayon has had to have less than 2.6 acetic acid groups for each cellulose group in order to permit acetone to be used as a solvent. In my present process I employ a product having more than 2.6 acetic acid groups for each cellulose group, but ordinarily less than 2.7 acetic groups for each cellulose group; and the present invention relates to the production of such acetone soluble cellulose actates, and to the resulting acetone soluble artificial silk produced therefrom.

It has long been known that cellulose acetate may be produced by the treatment of cellulose with acetic acid and acetic anhydride in the presence of sulfuric acid as a catalyst. It is also known that it is difficult and has been considered practically impossible to remove the resulting sulfuric acid residues from the cellulose acetate. When such cellulose acetate is made into artificial silk at first it appears to be of excellent quality, but due to the sulfuric acid residues present, it rapidly deteriorates with age, e. g., becomes brittle and decreases in tensile strength. Moreover, such a product, due to the sulfuric acid residues, has little resistance to heat. In my U. S. Patent No. 1,668,482 I have described one process for removing sulfuric acid residues from cellulose acetate. My present invention includes an improved and novel method whereby those aforementioned serious defects in artificial silk can be overcome, and the mixed acetate-sulfate esters of cellulose formed during esterification can be decomposed and a better artificial silk product obtained.

My improved method of manufacture has much in common with the ordinary process hitherto used in making cellulose acetate rayon, but is essentially differentiated therefrom as hereinafter described, and results in a new artificial silk product having more desirable characteristics than the cellulose acetate rayon hitherto made.

To enable others skilled in the art to adopt and use my invention and practice my improved process and produce the improved product, I will explain, as illustrative of my invention, one practical process of producing the improved rayon and the novel product of such process.

In carrying out my improved process cotton fiber or other suitable cellulose to be employed is dried until it contains approximately only 2% or 3% of moisture. The dried cellulose is then treated with approximately its own weight of acetic acid vapor and the resultant modified cellulose mass cooled to ordinary room temperature, say approximately 20° C.

To produce the primary esterification reaction of the modified cellulose mass it is then treated with a solution comprising by weight: approximately, acetic acid 85%, acetic anhydride 15% and catalyst, such as sulfuric acid, 0.3%. Preferably I use approximately one and a fifth parts, by weight, of the said solution to one part of the cellulose. During such treatment the temperature of the mass will tend to rise due to chemical reaction; but the temperature can easily be kept within the desired limit by use of external cooling.

When the primary reaction has ceased I again add a similar mixture of acetic acid, acetic anhydride and catalyst in two or three treatments, each treatment being with approximately one and a third times the weight of the cellulose employed. A final treatment may be made by a single addition, or best with two successive additions, of approximately the same weight portions as before of a mixture of about 15% acetic acid, 85% acetic anhydride and only about one third as much catalyst. If only a single final treatment is given the volume added should be, of course, the total of the two additions in the preferred procedure. During the last treatment the temperature may with advantage be permitted to rise to 50 or 60° C. After the addition of each portion of acetic anhydride mixture sufficient time is permitted to elapse until the resultant chemical reactions are approximately complete. Upon the completion of the reaction after the addition of the final portion of acetic anhydride mixture, the resultant cellulose acetate contains about 60% by weight of acetyl groups calculated as acetic acid.

The next step is to remove the sulfuric acid residues from the cellulose acetate product, which residues are present as mixed cellulose acetate-sulfate esters and are objectionable because of their undesirable subsequent effects upon the character of the rayon produced from such cellulose product. Simultaneously with the removal of the sulfate ester present in the acetate sulfate a portion of the acetyl group is removed and the cellulose acetate made acetone soluble.

This removal is accomplished by introducing an aqueous solution of acetic acid, containing a small quantity of hydrochloric acid substantially ionically equivalent in amount to the amount of sulfuric acid introduced in the earlier stage of the process. A larger amount may be used, but with no practical advantage. The amount of water present in this aqueous solution of acetic acid carrying hydrochloric acid should be sufficient to give a water content of about 10% for the entire contents of the acetylator. This amount of water, however, can be varied considerably, for example, between 5 and 15% without affecting the product greatly.

The mixture is then allowed to stand in the acetylator with moderate stirring, for some hours, until two reactions have occurred; to wit (1) the hydrolysis of the major part of the sulfuric groups from the cellulose, and (2) the partial hydrolysis of the acetyl groups from the cellulose. This last partial hydrolysis should be carefully watched and at the stage where the composition of the cellulose acetate present in the mixture has dropped from approximately 60% to approximately 55% acetyl groups, measured as acetic acid, the hydrolysis should be stopped by the addition of an amount of alkali, for instance a soda ash or sodium acetate solution, sufficient to neutralize the mineral acids, hydrochloric and sulfuric acids, present in the mixture.

The cellulose acetate is then precipitated from the solution by running the mass into water followed by thorough washing first with cold water and then with hot water. Approximately three-fourths of the sulfuric acid residues present in the crude acetyl cellulose are removed by the primary treatment with hydrochloric acid as above mentioned. The removal of the last portion of the sulfuric acid, roughly the last fourth, is accomplished by following the washing with cold water with three or four washings with hot water at a temperature of about 75° C.

The resulting clean and purified acetyl cellulose is dried at moderate temperatures. It can be dissolved in acetone or other solvent, or a mixture of solvents when it is desired to spin the same in making the desired rayon product.

In the new process above described the several operations can be carried out more rapidly than in the processes hitherto in use. For example, the time required for performing my improved process from the time that the dry cotton is taken until the dried cellulose acetate is prepared ready for solution in acetone or similar solvents, is only about 50 hours; whereas the processes heretofore commercially used require about 100 hours for completion.

The solution of cellulose acetate in a suitable solvent such as acetone is then spun to give a cellulose acetate rayon by known methods.

The novel rayon product obtained by my above described process differs from cellulose acetate rayon hitherto made in the following notable characteristics:

(a) It is practically completely free (less than 50 parts per million) from sulfuric acid residues or sulfate groups calculated as sulfuric acid; whereas hitherto cellulose acetate rayons which have been made by using sulfuric acid as a catalyst ordinarily contain 400 to 700 parts per million of sulfate groups calculated as sulfuric acid.

(b) It contains about 55% acetyl groups measured as acetic acid, whereas prior cellulose acetate rayons contain 53 to 54% acetyl groups and had to be so in order to permit acetone to be used as a solvent. Or expressed in another way, my novel artificial silk product carries between 2.6 and 2.7 acetic acid groups for each cellulose group, whereas prior artificial silks obtained by using sulfuric acid as a catalyst and acetone or equivalent materials as solvents, carry less than 2.6 acetic acid groups for each cellulose group. It is thought that the presence of the sulfate groups diminished the solubility in acetone.

(c) The cellulose acetate rayons previously made by using sulfuric acid as a catalyst and acetone or similar materials as solvents for spinning, will decompose on heating at much lower temperature than my artificial silk. For example, the best prior cellulose acetate rayons on the market if heated to 225° C. for a few minutes will change to a chocolate color; whereas my new rayon product is not appreciably changed from its original brilliant white at such temperature. Further the above mentioned prior commercial cellulose acetate rayons will partially melt at 235° C., whereas my new artificial silk product remains unaltered at such temperature except for a very slight change in color; and could not be seen to have melted even when subjected to a temperature of 240° C. for nearly an hour. After exposure of my novel artificial silk product for 30 minutes to a temperature of approximately 240° C. it had only darkened slightly to the color of ordinary wheat flour, and looked as if no change whatever in the fiber structure had taken place, but close examination showed that there had been some incipient fusion of the fibers so that some were adhering one to another; whereas under the same conditions, the previously known artificial silks mentioned would darken to the color of chocolate and fuse to the glass vessels in which the heating was done. At 245° C. the previously known artificial silks mentioned decompose with gas evolution, but even after an hour of heating during which the temperature reached as high as 262° C. my new artificial silk product just began to melt, without any apparent decomposition with gas evolution.

(d) My new artificial silk gives better absorption of basic dyes such as are commonly used on cellulose acetate rayons; that is, basic dyes work better on my new artificial silk than they do on the above mentioned prior cellulose acetate rayons. It will dye more deeply and more uniformly from a bath of the same concentration than do such prior cellulose acetate rayons. Conversely my new artificial silk is less rapidly dyed with acid colors than are the cellulose acetate rayons of the character hitherto known.

(e) The artificial silk made by my process does not lose its strength with time as do the above mentioned prior cellulose acetate rayons made by hitherto known processes.

I claim:

1. In the process of manufacturing cellulose acetate which comprises treating cellulose with acetic acid vapor, treating the modified cellulose with a solution of acetic acid, acetic anhydride and sulfuric acid to produce the primary esterification, and successively adding a series of portions containing acetic anhydride to the mixture and permitting proper chemical reaction after each such addition, the method of removing sulfuric residues which comprises adding an aqueous solution of acetic acid carrying a small quantity of hydrochloric acid to produce hydrolysis of the major part of the sulfuric groups from the cellulose and the partial hydrolysis of the acetyl groups from the cellulose; and precipitating the cellulose acetate.

2. In the process of manufacturing cellulose acetate which comprises treating cellulose with acetic acid vapor, treating the modified cellulose with a solution of acetic acid, acetic anhydride and sulfuric acid to produce the primary esterification reaction, successively adding a series of portions containing acetic anhydride to the mixture and permitting proper chemical reaction after each such addition until the resultant cellulose acetate contains about 60% by weight of acetyl groups calculated as acetic acid, the method of removing the sulfuric acid residues which comprises introducing an aqueous solution of acetic acid carrying a small quantity of hydrochloric acid and sufficient water to give a water content of about 10% in the mixture, permitting the mixture to stand until hydrolysis of the major part of the sulfuric groups from the cellulose and the partial hydrolysis of the acetyl groups from the cellulose results and the cellulose acetate is rendered soluble in acetone, stopping the hydrolysis by the addition of suitable alkali, and precipitating the cellulose acetate by adding the mixture to an excess of water.

3. In the process of manufacturing cellulose acetate which comprises treating cellulose with acetic acid vapor, treating the modified cellulose with a mixture of acetic acid, acetic anhydride and sulfuric acid to produce the primary esterification reaction, successively adding a series of portions containing acetic anhydride to the mixture and permitting an approximately complete chemical reaction after each such addition until the resultant cellulose acetate contains about 60% by weight of acetyl groups calculated as acetic acid, the method of removing sulfuric acid groups and a portion of the acetyl groups which comprises introducing an aqueous solution of acetic acid carrying a small quantity of hydrochloric acid and sufficient water to give a water content of about 10% to the mixture, permitting the mixture to stand until hydrolysis of the major part of the sulfuric groups and partial hydrolysis of the acetyl groups has taken place and the cellulose acetate is rendered soluble in acetone, stopping such hydrolysis when the composition of the cellulose acetate present in the acetyl groups measured as acetic acid has dropped to approximately 55% and precipitating the cellulose acetate by adding the mixture to an excess of water.

4. In the process of manufacturing cellulose acetate which comprises drying the cellulose, treating such cellulose with approximately its own weight of acetic acid vapor and cooling the modified cellulose, treating the modified cellulose with a solution of acetic acid, acetic anhydride and sulfuric acid in the approximate proportion of one and a fifth parts by weight of the solution to one part of the cellulose to produce primary esterification, then successively adding a series of portions containing acetic anhydride to the mixture and permitting approximately complete chemical reactions after each addition until the resultant cellulose acetate contains about 60% by weight of acetyl groups calculated as acetic acid, the method of removing sulfuric acid groups and a portion of the acetyl groups which comprises introducing an aqueous solution of acetic acid carrying a small quantity of hydrochloric acid substantially equivalent to the amount of sulfuric acid previously introduced, with sufficient water in the solution to give a water content of about 10%, permitting the mixture to stand until the reaction produces hydrolysis of the major part of the sulfuric groups from the cellulose and the partial hydrolysis of the acetyl groups from the cellulose and the cellulose acetate is made acetone soluble, stopping the hydrolysis by the addition of an alkali when the composition of the cellulose acetate has dropped to approximately 55% of acetyl groups measured as acetic acid, and precipitating the cellulose acetate by adding the mixture to an excess of water.

5. The process of manufacturing cellulose acetate which comprises acetylation of cellulose with acetic anhydride, acetic acid and a sulfur compound as catalyst, and hydrolyzing the resulting cellulose acetate with an aqueous solution of acetic acid containing hydrochloric acid, the proportion of water in said solution being sufficient to produce a water content of between 5 and 15 percent of the entire contents of the acetylator.

6. A cellulose acetate artificial silk, in which the cellulose acetate is made in accordance with the method set forth in claim 1, said artificial silk being soluble in acetone, carrying more than 54% acetyl group measured as acetic acid, and containing sulfuric acid groups measured as sulfuric acid in an amount not exceeding 50 parts per million.

7. A cellulose acetate artificial silk, in which the cellulose acetate is made in accordance with the method set forth in claim 1, said artificial silk being soluble in acetone and containing sulfuric acid groups in an amount not exceeding 50 parts per million.

8. A cellulose acetate artificial silk, in which the cellulose acetate is made in accordance with the method set forth in claim 1, said artificial silk being soluble in acetone, containing sulfuric acid groups measured as sulfuric acid in an amount not exceeding 50 parts per million, said artificial silk also containing over 54% of acetyl groups measured as acetic acid and being capable of withstanding a temperature of approximately 225° C. without appreciable change in color, and capable of withstanding a temperature of approximately 240° C. without decomposition with evolution of gas.

HENRI LOUIS BARTHELEMY.